US011182715B2

United States Patent
Voorhies et al.

(10) Patent No.: US 11,182,715 B2
(45) Date of Patent: Nov. 23, 2021

(54) SYSTEMS AND METHODS FOR ORCHESTRATING AUTONOMOUSLY AND MANUALLY PERFORMED OPERATIONS

(71) Applicant: inVia Robotics, Inc., Westlake Village, CA (US)

(72) Inventors: Randolph Charles Voorhies, Sherman Oaks, CA (US); Lior Elazary, Agoura Hills, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 80 days.

(21) Appl. No.: 16/504,139

(22) Filed: Jul. 5, 2019

(65) Prior Publication Data
US 2021/0004746 A1    Jan. 7, 2021

(51) Int. Cl.
*G06Q 10/06*   (2012.01)
*B25J 9/16*   (2006.01)
*G06F 16/901*   (2019.01)

(52) U.S. Cl.
CPC ...... *G06Q 10/06315* (2013.01); *B25J 9/1661* (2013.01); *G06F 16/9024* (2019.01)

(58) Field of Classification Search
CPC ............. G06Q 10/06315; B25J 9/1661; G06F 16/9024
See application file for complete search history.

(56) References Cited

U.S. PATENT DOCUMENTS

| 6,102,958 | A | * | 8/2000 | Meystel | G06F 17/10 700/286 |
| 8,577,126 | B2 | * | 11/2013 | Jones | H04N 7/185 382/154 |
| 2014/0222521 | A1 | * | 8/2014 | Chait | G06Q 10/0637 705/7.36 |
| 2016/0275202 | A1 | * | 9/2016 | Lee | G06F 16/2365 |
| 2017/0293844 | A1 | * | 10/2017 | Gombolay | G05B 13/028 |

(Continued)

OTHER PUBLICATIONS

"Decentralised online planning for multi-robot warehouse commissioning" D Claes, F Oliehoek, H Baier . . . - . . . of The 16th . . . 2017—livrepository.liverpool.ac.uk (Year: 2017).*

(Continued)

*Primary Examiner* — Jonathan G Sterrett
(74) *Attorney, Agent, or Firm* — Ansari Katiraei LLP; Arman Katiraei; Sadiq Ansari

(57) ABSTRACT

A controller is provided to orchestrate operations of two or more different actors or resources in completing a task. The controller orchestrates the operations based on a dependency graph that the controller generates for each received task. The dependency graph has a linked list of nodes. Each node includes a different set of operations for completing a different part of a task represented by that dependency graph. Each set of operations associated with a node may be dependent on the successful completion of a prior set of operations associated with a prior linked node in the same dependency graph. The controller may allocate different sets of operations from different nodes of the dependency graph to different human or robotic resources, and may track the status of multiple tasks in parallel based on the progression through different nodes of the corresponding dependency graphs.

19 Claims, 9 Drawing Sheets

(56) References Cited

U.S. PATENT DOCUMENTS

2018/0293498 A1* 10/2018 Campos .............. G06F 30/20
2020/0027006 A1*  1/2020 Gupta ............... G06Q 10/0631
2020/0097844 A1*  3/2020 Kansky ................ G06N 5/04

OTHER PUBLICATIONS

"Human-multi-robot team collaboration for efficient warehouse operation" A Rosenfeld, A Noa, O Maksimov . . . —Autonomous Robots . . . 2016—users.umiacs.umd.edu (Year: 2016).*
ROS: an open-source Robot Operating System M Quigley, K Conley, B Gerkey, J Faust . . . - . . . on open source . . . . 2009—willowgarage.com (Year: 2009).*
"Manipulation planning among movable obstacles" M Stilman, JU Schamburek, J Kuffner . . . - . . . conference on robotics . . . 2007—ieeexplore.IEEE.org (Year: 2007).*
"Towards remote teleoperation of a semi-autonomous mobile manipulator system in machine tending tasks" V Annem, P Rajendran . . . —International . . . Jun. 10-14, 2019—asmedigitalcollection.asme.org (Year: 2019).*

* cited by examiner

SYSTEMS AND METHODS FOR ORCHESTRATING AUTONOMOUSLY AND MANUALLY PERFORMED OPERATIONS

BACKGROUND INFORMATION

In a multi-actor workflow, different actors may contribute to the completion of a task by performing different subtasks of the overall task. Completion of the overall task may depend on successful completion of each subtask, and, in some cases, completion of one subtask may depend on successful completion of another subtask. Accordingly, each actor may influence the entire workflow, and may compromise productivity if slow to complete a subtask or unavailable because the actor is occupied performing other operations. A particular actor in the multi-actor workflow can also create a cascading delay when other actors are prevented from completing their respective subtasks because their subtasks are dependent on the particular actor completing its subtask.

Productivity issues can be exacerbated in a multi-actor workflow when the actors do not or cannot communicate with one another, or when the actors operate independent of one another. For instance, human workers may independently make decisions on what subtasks to perform and how to perform them, and robots, that work in collaboration with the humans, may be controlled by a separate system. In this scenario, if a human or robot experiences some issue, the other actors in the workflow may have no knowledge of the issue, may be unable to workaround the issue, and may simply wait until the issue is resolved, thereby leaving the overall task incomplete.

DETAILED DESCRIPTION OF PREFERRED EMBODIMENTS

Figure 1:
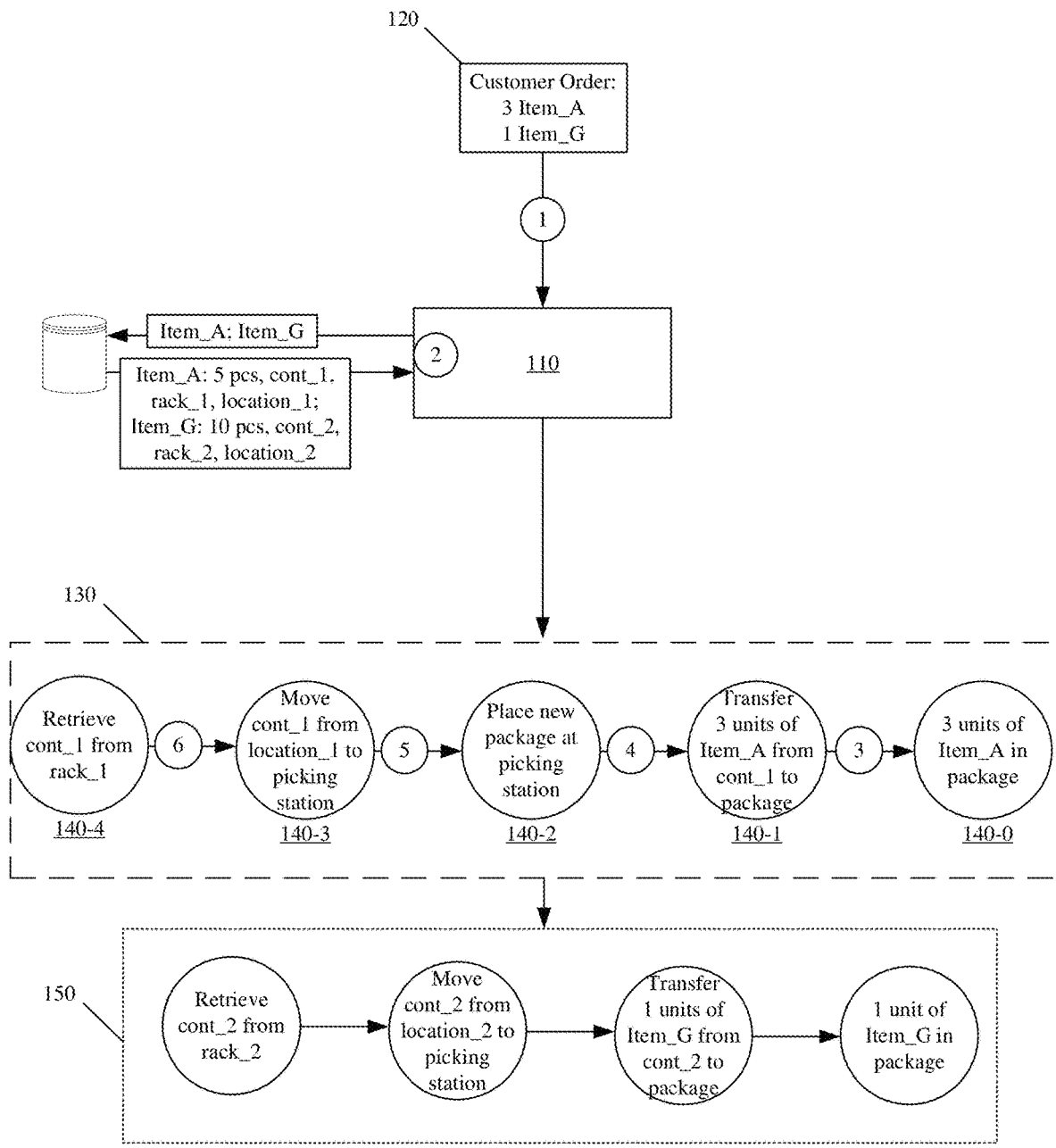
FIG. 1 conceptually illustrates the dependency graph generation in accordance with some embodiments presented herein.

The following detailed description refers to the accompanying drawings. The same reference numbers in different drawings may identify the same or similar elements.

Systems and methods, as described herein, provide a controller for orchestrating operations of different actors, that may include human workers, autonomous robots, and/or other machines or devices, in simultaneously and/or collaboratively completing different tasks. The controller may dynamically shift the actors between performing different subtasks of different tasks in a manner that optimizes the effectiveness of each actor based on the current state of each actor and the current state of resources that the actors use to perform the subtasks. The resources may include any physical or logical resource in a site that actors access, manipulate, or perform state transformations on during the completion of a subtask.

The controller may receive tasks that are to be executed by actors in a site. For each received task, the controller may determine the task end state, and may work backwards from the end state to define various dependent state transformations that bring about the task end state based on the current state of resources and the current state of different actors used at each state transformation.

In some embodiments, the controller may generate a dependency graph to model the state transformations that complete each task. The dependency graph may specify a particular state transformation or subtask dependency ordering by which two or more actors may achieve the task end state.

The dependency graph may include an end node that represents the end state of the task represented by the dependency graph. The dependency graph may further include a linked list of nodes that link to the end node. Each node in the linked list specifies a different state transformation that is dependent on successful completion of an earlier state transformation, and that advances the current state of resources and actors towards the task end state.

The controller may allocate different actors to different nodes of the dependency graph based on the current state of the actors and the current state of resources needed by the actors to complete the state transformation associated with each node. The allocation maximizes the throughput of the actors by using the same actor for different nodes of different dependency graphs. In particular, the controller may assign the same actor to perform related or common state transformations of different dependency graphs or tasks, or to perform specific state transformations of different dependency graphs or tasks that the actor is most efficient at.

The controller may monitor the progression through the dependency graph via a feedback loop, and may dynamically adjust the state transformations and the corresponding nodes of the dependency graph that are needed to reach a task end state in response to detecting an error during completion of a particular state transformation associated with a particular node of the dependency graph. The controller may make the dynamic adjustments by accounting for the current state of resources and actors in the site at the time of the error, including resources and actors allocated to the nodes of the impacted dependency graph, allocated to the nodes of other dependency graphs, and unallocated resources and actors. In this manner, the controller may control the actors in performing the dependent state transformations that are needed to complete multiple tasks in parallel without conflict and with balanced usage of the actors and resources.

FIG. 1 conceptually illustrates the dependency graph generation in accordance with some embodiments presented herein. FIG. 1 includes controller 110 receiving (at 1) task 120 that defines a desired end state. For instance, task 120 may be an order fulfillment task with an end state specifying a completed customer order comprised of three units of a first object (e.g., "Item_A") and one unit of a second object (e.g., "Item_G").

Controller 110 may query (at 2) memory or one or more databases to determine a current state of the first object and the second object. In response to the query (at 2) for the current state of the first object, controller 110 determines that five units of the first object are stored in a first container that is located on a first rack at a first location in a site. In response to the query (at 2) for the current state of the second object, controller 110 determines that ten units of the second object are stored in a different second container that is located on a different second rack at a different second location in the site.

First task 120 provides controller 110 with the desired end state, and the queries provide the current state of the objects needed for the task end state. Controller 110 may now generate one or more dependency graphs for first task 120 by working backwards from the task end state.

For instance, controller 110 may generate (at 3) first dependency graph 130 with first node 140-1 that links to the end state (e.g., end node 140-0), wherein the end state or end node 140-0 specifies fulfilling the first object of the customer order. First node 140-1 may comprise a first state transformation for producing the task end state for the first object. The first state transformation may involve transferring three units of the first object from the first container to a customer order package at a picking station.

Controller 110 may select the first state transformation from a plurality of state transformations. Each state transformation of the plurality of state transformations may correspond to a different set of operations that is supported by one or more actors in the site, and that can be performed by the supported actors to bring about specified changes to a last state of one or more resources.

Each state transformation may include one or more dependency rules. The dependency rules may specify other state transformations from the plurality of state transformations that must be completed prior to the selected state transformation being performed. For instance, controller 110 may determine, based on the state transformation dependencies, that the task end state for the first object is dependent on successful completion of the first state transformation, and that the first state transformation is dependent on successful completion of a second state transformation and a third state transformation.

The second state transformation, representing the first dependency of the first state transformation, may include transferring an empty customer order package to the picking station. In other words, the first dependency is a rule from which controller 110 determines that the first object cannot be transferred into the package at the picking station until the package is placed at the picking station. Accordingly, controller 110 may link (at 4) second node 140-2, that comprises the second state transformation, off first node 140-1. Consequently, the state transformation ordering of first dependency graph 130 now specifies executing the second state transformation before the first state transformation.

The third state transformation, representing the second dependency of the first state transformation, may include transferring the first container, that contains multiple units of the first object, from the first rack at the first location to the picking station. In other words, the second dependency is a different rule form which controller 110 determines that the first object cannot be transferred into the package at the picking station until the first container, that contains multiple units of the first object, is moved from its storage location to the picking station. Accordingly, controller 110 may link (at 5) third node 140-3 off of second node 140-2. Third node 140-3 comprises the third state transformation for changing the state of the first container by moving the first container from its current location (e.g., the first rack at the first location) to the picking station.

The third state transformation may include its own dependency from which controller 110 determines that the first container cannot be moved to the picking station until an actor moves to retrieve the first container from the first rack at the first location. Accordingly, the third state transformation may include a rule that links the third state transformation to a fourth state transformation.

The fourth state transformation may involve changing the state of the first container by retrieving the first container from the first rack at the first location. Accordingly, controller 110 may generate and add (at 6) fourth node 140-4 off third node 140-3 of first dependency graph 130.

Controller 110 may generate second dependency graph 150 with nodes that specify similar state transformations for retrieving the second container from the second rack at the second location to the picking station before one unit of the second object can be picked from the second container and placed into the package at the picking station. Nevertheless, first and second dependency graphs 130 and 150 comprise different nodes that are defined to include different resources by which two or more different actors can complete task 120.

As shown in FIG. 1, the nodes of first and second dependency graphs 130 and 150 are not dependent or otherwise linked to one another. Accordingly, controller 110 may use different actors to complete the state transformations of first dependency graph 130 at the same time or in parallel with the state transformations of second dependency graph 150. Controller 110 may however stagger or start execution of the second dependency graph 150 after first dependency graph 130 because first dependency graph 130 includes second node 140-2 for placing at the picking station, the package that will hold the different objects picked via first and second dependency graphs 130 and 150. In some embodiments, second dependency graph 150 may be linked off first dependency graph 120 such that the state transformations of dependency graphs 130 and 150 are performed serially.

In FIG. 1, controller 110 may generate dependency graphs 130 and 150 based on the current state of the resources needed to complete task 120. The resources include the picking station, the package, the first and second objects, the first and second containers, the first and second racks, the first and second locations, and/or physical and logical resources implicated by the state transformation (e.g., a path or space from which to move the first container to the picking station).

The current state of the resources may include availability, location, and/or other characteristics of the resources. For instance, the current state may include tracking the quantity of items in the first and second containers, and changing that particular state once the specified units of the first and second objects are removed from the containers in order to fulfill task 120. Other characteristics may include the dimensions (e.g., size, weight, etc.) of the containers. The dimensions may condition the specific set of operations by which the state transformations can be completed. For instance, a container that is too large or too heavy may not be moved by a human worker, and may require a forklift or other device to transfer.

Each successfully or unsuccessfully performed node of first and second dependency graphs 130 and 150 may change the current state of one or more of the implicated resources. For instance, successful completion of third node 140-3 may result in state transformations that change the location of the first container from the first storage location to the location of the picking station. In this instance, controller 110 may update the location of the first container in memory or a database that tracks inventory. Similarly, successful completion of first node 140-1 may result in state transformations that change the remaining number of items in the first container, and that change the number of items in the package. Again, controller 110 may update the first object inventory as tracked in the memory or an inventory database upon completion of first node 140-1.

The dependency graph generation may also be based on the current state of the actors in the site that controller 110 uses to perform the state transformations associated with each of the nodes of dependency graphs 130 and 150. Accordingly, the dependency graph generation may further include allocating actors to perform the different state transformations associated with each node of dependency graphs 130 and 150 based on the current state of the actors.

Figure 2:
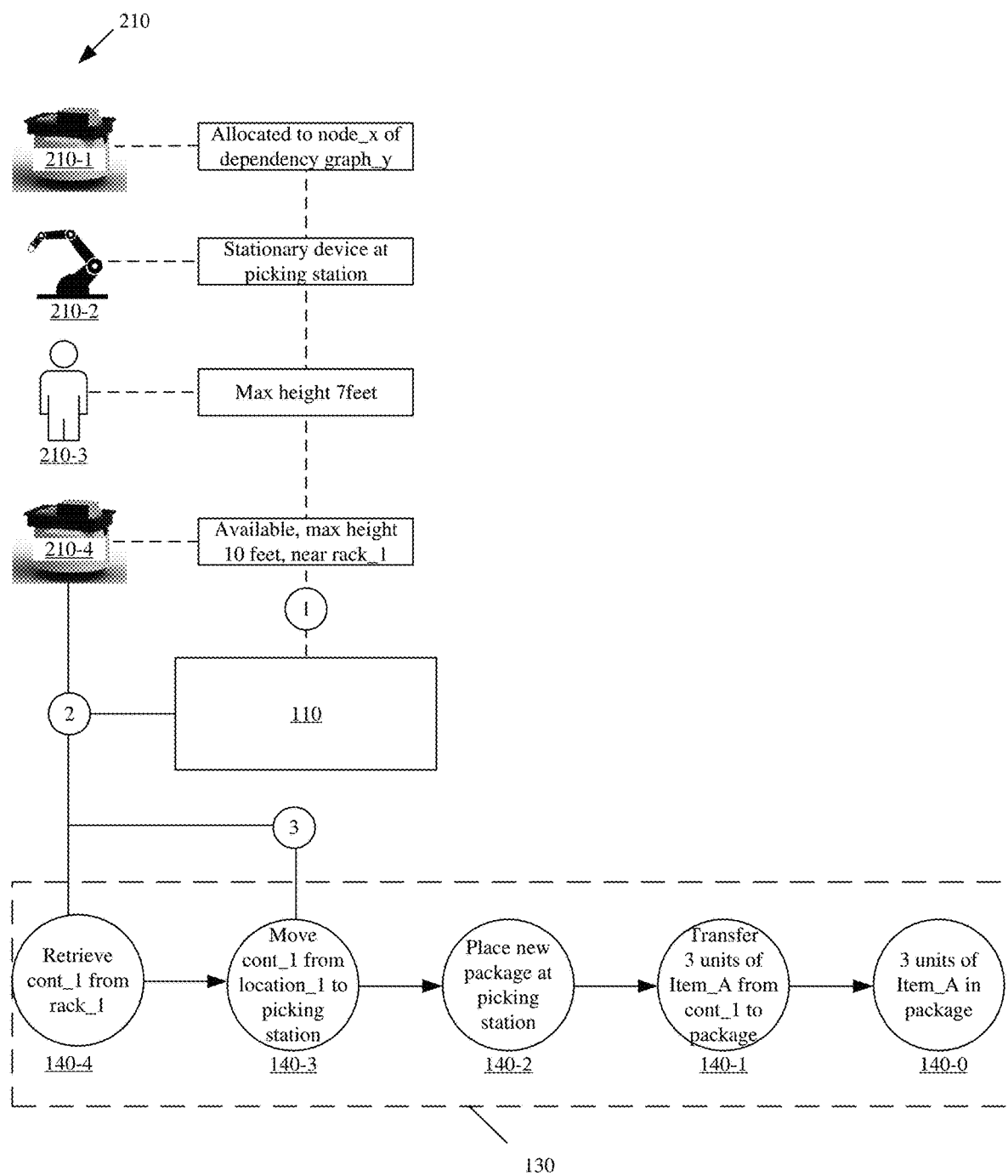
FIG. 2 illustrates an example of the dependency graph node allocation performed by a controller in accordance with some embodiments described here.

FIG. 2 illustrates an example of the dependency graph node allocation performed by controller 110 in accordance with some embodiments described here. Specifically, FIG. 2 illustrates controller 110 allocating different nodes 140 of first dependency graph 130 to a particular actor from a set of actors 210.

To perform the node allocation, controller 110 may track (at 1) the current state of actors 210 in the site to determine their availability, location, capability, and/or other characteristics. Controller 110 may track (at 1) the current state of actors 210 based on nodes that controller 110 allocates to one or more of actors 210, and controller 110 tracking the completion of the nodes by different actors 210. Controller 110 may, alternatively or additionally, track (at 1) the current state of actors 210 based on status updates or messaging that controller 110 receives from actors 210. Actors 210 may provide the status updates upon completing different assigned subtasks or state transformations associated with allocated nodes of different dependency graphs, or may provide wireless messages to controller 110 to notify controller 110 as to the location and/or operational status of each node 210. In some embodiments, controller 110 may modify the current state of each node 210 based on a programmed set of characteristics for each actor 210. For instance, controller 110 may be programmed with different state transformations that each actor 210 is capable of performing (e.g., retrieval, transfer, picking, packaging, and/or other operations such as transferring heavy objects versus transferring light objects or picking large objects versus picking small objects).

Controller 110 may begin the allocation starting from fourth node 140-4 corresponding to the earliest unallocated node of dependency graph 130. Controller 110 may condition the allocation based on one or more requirements associated with the state transformations specified for fourth node 140-4. For instance, the state transformations specified for fourth node 140-4 may require an actor that is capable of moving to the first rack at the first location, and that is further capable of retrieving the first container from the first rack. The state transformation requirements and current state of actors 210 prevent using first actor 210-1, second actor 210-2, or third actor 210-3 to complete the state transformations of fourth node 140-4. In particular, first actor 210-1 is unavailable because first actor 210-1 is occupied performing operations of a node for another dependency graph, second actor 210-2 is not capable of performing container retrieval operations because second actor 210-2 is a stationary device, and third actor 210-3 is unable to reach the height of the first container on the first rack without additional equipment. Accordingly, controller 110 may allocate (at 2) fourth node 140-4 to fourth actor 210-4 based on the current state of fourth actor 210-4 indicating that fourth actor 210-4 is available and capable to perform the state transformations of fourth node 120-4.

Controller 110 may also allocate (at 3) third node 140-3 to fourth actor 210-4 as the state transformations of third node 140-3 depend on successful completion of the state transformations of fourth node 140-4, and fourth actor 210-4 would already have access to the resources (e.g., the first container) needed for completing the state transformations of third node 140-3 as a result of completing the state transformations of fourth node 140-4. Therefore, for efficiency, controller 110 controls fourth actor 210-4 in also performing the state transformation of third node 140-3.

In some embodiments, nodes that are more efficiently performed by the same actor may be tagged with a common identifier. The common identifier may indicate that state transformations of different directly linked nodes require the same resources or actors with the same capabilities, functionality, and/or characteristics. Accordingly, when controller 110 detects a particular identifier assigned to fourth node 140-4 and third node 140-3, controller 110 may assign the state transformations for both nodes 140-4 and 140-3 to the same actor 210-4 for execution. In some embodiments, the state transformation dependencies may include the tags to specify whether the same or a different actor may be used for the dependent state transformations of different nodes.

Figure 3:
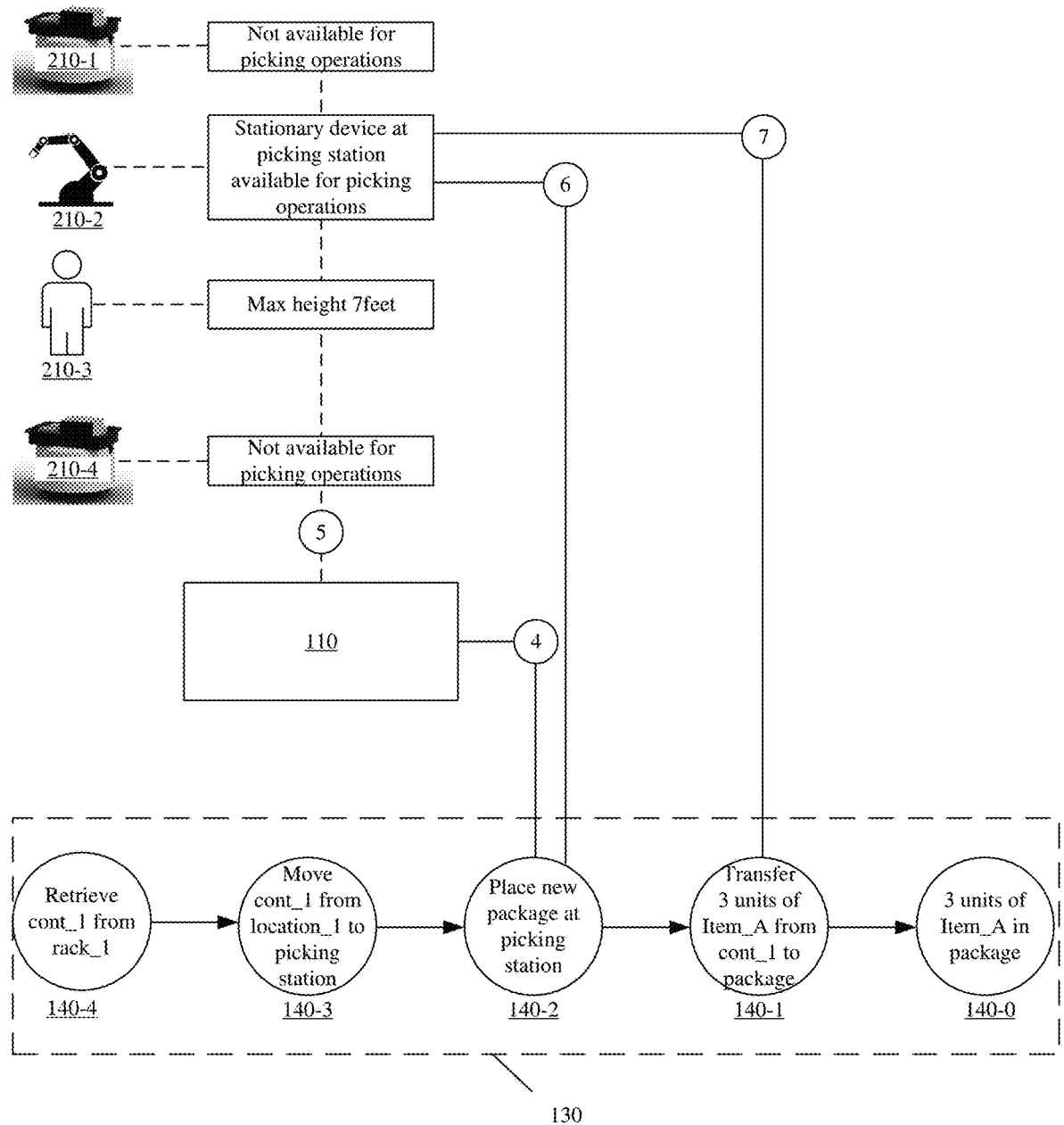
FIG. 3 illustrates the controller continuing with the node allocation of a first dependency graph in accordance with some embodiments presented herein.

FIG. 3 illustrates controller 110 continuing with the node allocation of first dependency graph 130 in accordance with some embodiments presented herein. After allocating (at 2 and 3 in FIG. 2) nodes 140-4 and 140-3, controller 110 may select (at 4) second node 140-2 as the next earliest unallocated node of first dependency graph 130. Controller 110 may track (at 5) an updated state of actors 210, and may condition the updated current state of actors 210 based on the requirements associated with the state transformations specified for second node 140-2.

Controller 110 may determine that fourth actor 210-4, previously allocated to perform the state transformations of fourth node 140-4 and third node 140-3, does not meet the requirements associated with the state transformations specified for second node 140-2. Controller 110 may further determine that second actor 210-2 is available and capable of performing the state transformations of second node 140-2, and therefore allocates (at 6) second node 140-2 to second actor 210-2. Controller 110 further determines that second actor 210-2 may also perform the state transformations of first node 140-1, and therefore allocates (at 7) first node 140-1 to second actor 210-2. Here again, second node 140-2 and first node 140-1 may be tagged with a common identifier, the common identifier may indicate that the state transformations of the different nodes involves the same resources and require actors with the same capabilities, functionality, and/or characteristics, and controller 110 may assign the state transformations of nodes 140-2 and 140-1 to the same actor 210-2 based on the common identifier. Based on the allocation identified in FIG. 3, controller 110 may allocate (at 7) first node 140-1 of first dependency graph 130 to second actor 210-2 to control second actor 210-2 in picking three units of the first object from the first container and in placing the three units into the package at the picking station, once fourth actor 210-4 transfers the first container to the picking station.

In some embodiments, each node of a dependency graph may include a time window for the expected amount of time that an actor needs to complete the corresponding state transformations. In some such embodiments, the state transformations used to generate the nodes of the dependency graphs may be associated with different time windows. In some other embodiments, controller 110 may derive the time windows based on the state transformations for different nodes of a dependency graph. Controller 110 may use the time windows to update the current state of resources and actors 210 that are implicated by or involved with different nodes of a dependency graph.

Figure 4:
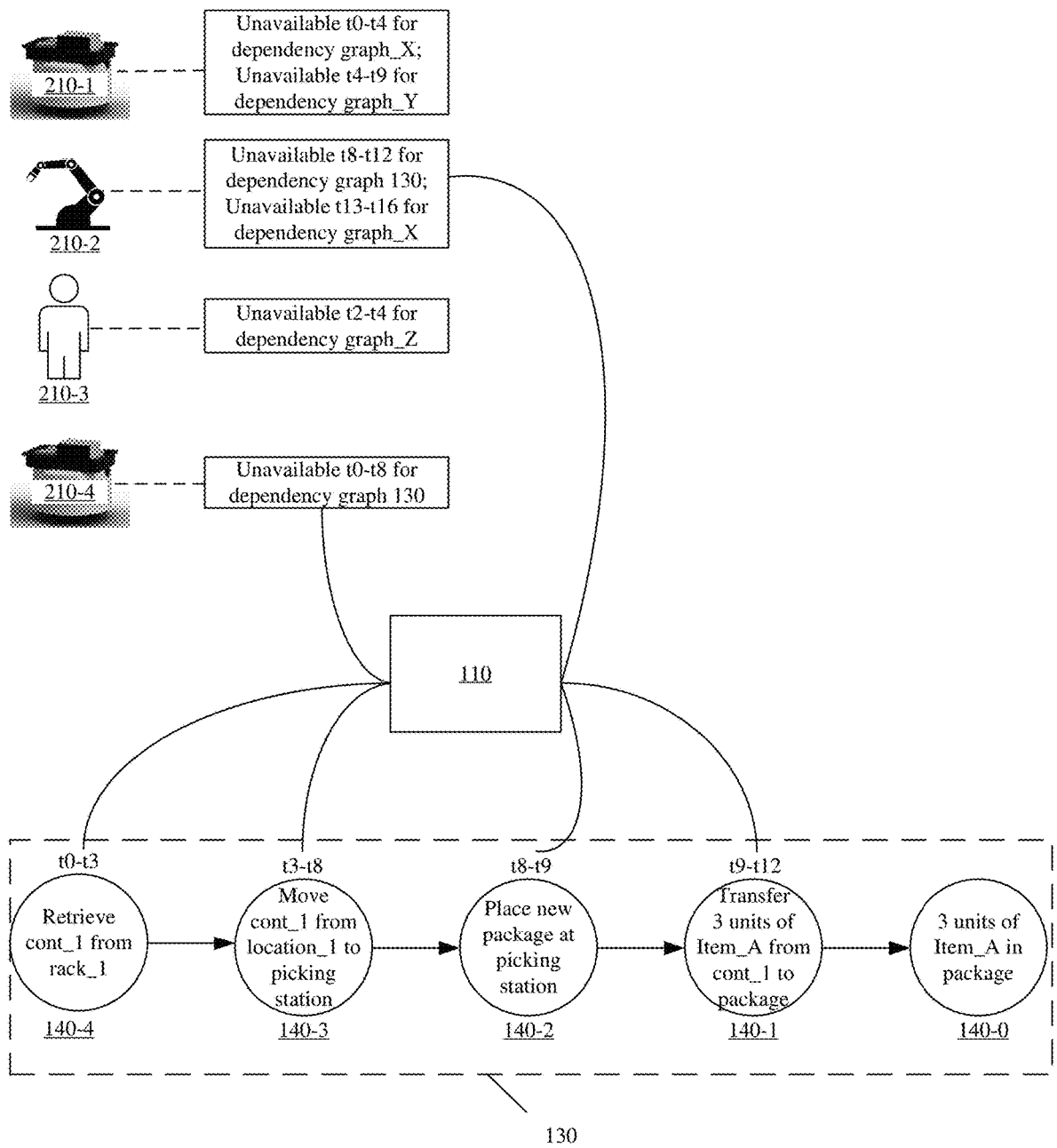
FIG. 4 illustrates using the time windows to update the current states of actors in accordance with some embodiments described herein.

FIG. 4 illustrates using the time windows to update the current states of actors 210 in accordance with some embodiments described herein. In FIG. 4, nodes 140 of first dependency graph 130 include different time windows corresponding to the expected time or an allotted time by which the state transformations associated with each node 140 are to be completed. Controller 110 may use the time windows for allocated nodes to update the current state of actors 210. In particular, controller 110 may update the current state of actors 210 to reflect times at which different actors 210 are unavailable because they have been allocated to perform the state transformations from different nodes of different dependency graphs.

Controller 110 may also use the time windows to update the current state of the implicated resources. For instance, during the same time envelope that fourth actor 210-4 retrieves and transfers the first container, controller 110 may update the current state of the first container to indicate that it is unavailable and cannot be associated with nodes of a dependency graph other than first dependency graph 130. Controller 110 may also update the current state of the first container to update the location of the first container after it is moved from the first rack to the picking station.

In some embodiments, controller 110 may update the current state of actors and resources without the time envelopes. For instance, controller 110 may update the availability of an actor or resource based on whether the actor or resource has been already been allocated to a dependency graph node whose state transformations have not yet been completed and remain outstanding. In some such embodiments, controller 110 may allocate actors and resources to the earliest pending node, that remains incomplete, in a dependency graph, rather than allocating actors and resources to all pending nodes of the dependency graph. Alternatively, controller 110 may allocate actors and resources to the one or more earliest pending nodes with dependencies that require the actors and/or resources. For instance, controller 110 may update the state of the first rack in FIG. 1 to be unavailable only for the fourth node 140-4 of dependency graph when the first container is to be retrieved from the first rack, but may update the state of the first container in FIG. 1 to be unavailable throughout nodes 140 of first dependency graph 130 since the first container is part of the state transformations specified for each node 140 of first dependency graph 130. Updating the state of an actor or resource may include updating any of the availability, location, capability, and/or other characteristics of the actor or resource.

Accordingly, based on the dependency graphs and the actor allocation to different nodes of the dependency graphs, controller 110 may orchestrate the operations of the different actors, may orchestrate usage of the site resources, and may control the interactions that the actors have with resources in the site as well as the interactions that actors have with one another in order to complete tasks received by controller 110. In some embodiments, controller 110 may efficiently allocate actors and resources to nodes in a manner that minimizes wait times of each actor, minimizes conflict between the actors and/or resources, and maximizes the speed with which the tasks are completed.

At any given time, controller 110 may produce, retain, manage, and/or track a plurality of dependency graphs for a plurality of incomplete tasks. Specifically, controller 110 may generate a dependency graph for each task upon receiving that task. However, the number of tasks or dependency graphs that can be completed at any given time may be limited by the number of actors and/or resources available to controller 110, dependencies between the dependency graph nodes, and/or the speed with which the actors complete each task. For instance, controller 110 may receive ten different tasks, and may generate ten different dependency graphs. Controller 110 may then orchestrate the completion of two tasks or two dependency graphs at the same time when controller 110 has access to three actors, and at least two of the three actors are needed at different times to complete each one of the two dependency graphs. Accordingly, controller 110 may store or queue a dependency graph for some task while allocating actors and resources to complete other tasks.

Controller 110 may allocate the state transformations associated with different dependency graph nodes to different actors via wireless messaging. Different actors may support different forms of wireless communication, or may use different devices to communicate with controller 110.

For instance, controller 110 may send instructions to a device that is near or carried by a human worker, and the instructions may orchestrate or control the operations of the human worker. The device may include a connected tablet, smartphone, watch, or other mobile device that is carried by the human worker. The device may also include a computer with a monitor that is located near where the human worker operates.

Controller 110 may send commands to a robot or machine, and the commands may directly control operation of the robot or machine, or may direct the robot or machine in performing different state transformations. Specifically, controller 110 may activate one or more of the robot or machine's sensors and actuators to perform different state transformations with that robot or machine.

Accordingly, controller 110 may provide different commands or messaging based on the actor receiving the commands or messaging, and/or based on the type of control controller 110 has over the actor. Moreover, controller 110 may adapt the messaging based on the intended actor. For instance, controller 110 may provide a human worker with a map to a desired location and a picture of a desired object at the desired location as part of the messaging instructing the human worker to perform a particular set transformations, and may provide a robot with coordinates of the desired location and a fiducial that identifies the desired object when scanned with a camera or other sensor of the robot as part of the messaging instructing the robot to perform the same particular set of transformations.

Figure 5:
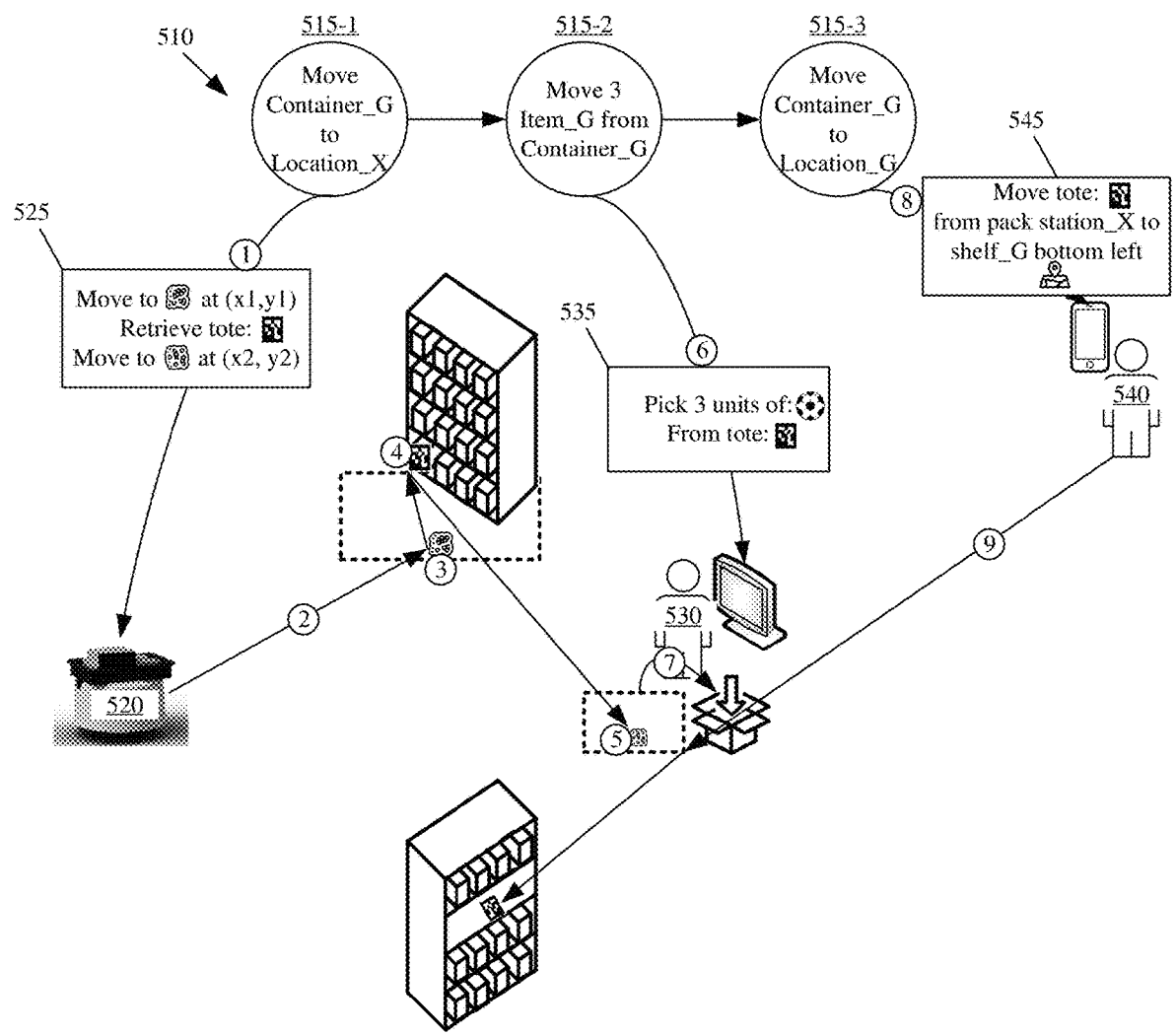
FIG. 5 illustrates the controller providing different messaging to different actors allocated to perform different state transformations from a dependency graph in accordance with some embodiments described herein.

FIG. 5 illustrates controller 110 providing different messaging to different actors allocated to perform different state transformations from dependency graph 510 in accordance with some embodiments described herein. Dependency graph 510 includes first node 515-1 specifying a first set of state transformations for moving a container from a storage location to a picking station, second node 515-2 specifying a second set of state transformations for picking three units of an object from the container at the picking station, and third node 515-3 specifying a third set of state transformations for returning the container to a different storage location.

In FIG. 5, controller 110 allocates (at 1) the first set of state transformations of first node 515-1 to robot 520 for execution by providing first set of messages 525 over a wireless network to robot 520. First set of messages 525 may specify move, retrieve, and transfer operations, and may include a first set of coordinates, a first identifier, a second identifier, a third identifier, and a second set of coordinates.

Robot 520 may plot (at 2) a path from its current location to the storage location of the container using the first set of coordinates. Robot 520 may verify that it has reached the storage location based on the first identifier. The first identifier may be present at the storage location, and may be a fiducial, a visual feature, barcode, or other salient queue that robot 520, via one or more sensors, scans or detects (at 3) to verify arrival at the correct location.

The first set of state transformations may specify a dependency between the move operation and the retrieval operation. Specifically, robot 520 may not start the retrieval operation until the move operation is successfully completed (e.g., via scanning of the first identifier). The retrieval operation may involve the second identifier from first set of messages 525. Specifically, robot 520 may identify the target container from other containers at the storage location using the second identifier. For instance, the second identifier may be a fiducial or other visual identifier on the target container, or may specify characteristics of the particular container such as the expected weight, expected dimensions, and/or other properties of the particular container or items in the particular container. Upon detecting the second identifier, robot 520 may retrieve (at 4) the target container from the storage location, and may begin the last of the first set state transformations for moving the container to the picking station.

Robot 520 may use the second set of coordinates, provided with first set of messages 525, to generate a path with which to move the container from the storage location to the picking station. Robot 520 may confirm that it has arrived at the picking station by detecting (at 5) the third identifier that is located at or near the picking station, and by providing the third identifier as location confirmation to controller 110.

Robot 520 may successfully complete the first set of state transformations associated with first node 515-1 of dependency graph 510 upon performing each of the specified operations, and verifying completion by scanning or otherwise detecting the first, second, and third identifiers and/or by providing the identifiers to controller 110. In some embodiments, first node 515-1 can be separated into three separate nodes of dependency graph 510 because the first set of state transformations involves three separate state transformations that are performed using robot 520 (e.g., a first state transformation for moving robot 520 to the storage location, a second state transformation for retrieving the container from the storage location, and a third state transformation for moving robot 520 with the container to the picking station). In some such embodiments, controller 110 may similarly separate first set messages 525 into three messages that controller 110 sends to robot 520 at different times coinciding with the time at which robot 520 begins performing each of the first, second, and third state transformations.

In some embodiments, first set of messages 525, or the first, second, and third messages that form first set of message 525, may include commands that directly control operation of robot 520 in performing each of the first, second, and third state transformations of the first set of state transformations associated with first node 515-1 of dependency graph 510. In other words, controller 110 may remotely control robot 520. In some other embodiments, first set of messages 525 may include instructions that are provided to robot 520, and robot 520 autonomously executes actions based on the instructions.

After detecting successful completion of the first set of state transformations, and progressing past first node 515-1 in dependency graph 510, controller 110 may provide a different second set of state transformations from second node 515-2 of dependency graph 510 to first human worker 530. The second set of state transformations may include transferring three units of an item from the container into a customer order package at the picking station.

Controller 110 may provide (at 6) the second set of state transformations as second set of wireless messages 535 to a connected device of first human worker 530. Controller 110 may be configured with the Internet Protocol ("IP") or other addressing of robots and devices used by human workers in a site. Controller 110 may adjust the content of messages 535 based on the allocated actor being first human worker 530 who will receive and execute those operations. For instance, second set of messages 535 may include images of the items that first human worker 530 is to pick from the container delivered by robot 520. Second set of messages 535 may further identify the package that is to receive the picked items. In some embodiments, second set of messages 535 may provide textual instructions or graphics on a display carried by or near first human worker 530. The instructions may be color coded, contain animations, or other identifiers to aid first human worker 530 in faster completion of the second set of state transformations. First human worker 530 may confirm (at 7) each picked item by using a device to scan an identifier of each picked item that is placed into the customer order package, and by providing the scanned identifiers back to controller 110.

Here again, the second set of state transformations associated with second node 515-2 can be separated into multiple nodes. For example, second node 515-2 of dependency graph 510 may be expanded into three different nodes with each of the three different nodes directing or controlling first human worker 530 in picking one item from the container. More specifically, a first node may specify picking a first item of a first color from the container, and depositing the first item in a first customer order package. A second node may specify picking the first item of a different second color from the container, and depositing the first item of the second color in the first customer order package. A third node may specify picking a second item of a larger size from the container, and depositing the second item in a different second customer order package that is also located at the picking station.

Third node 515-3 of dependency graph 510 may be linked to second node 515-2, and may comprise a third set of state transformations that are dependent on successful completion of the second set of state transformations. In particular, the third set state transformations may include returning the container into a storage location once the three units of the item have been picked from the container. Controller 110 may provide (at 8) a third set of messages to second human worker 540 to direct or control second human worker 540 in moving (at 9) to the picking station, retrieving the container, and returning the container to a designated storage location.

Although the third set of state transformations involve similar move operations as the first set of state transformations provided to robot 520, controller 110 may convey the third set of state transformations differently to second human worker 540 than robot 520. For instance, rather than provide identifiers and coordinates for the source and destination locations, controller 110 may provide (at 9) a map that charts a path for second human worker 540 to follow in order to retrieve the container from the picking station and to return the container to a storage location. The third set of messages may also include images and/or other visual identifiers by which second human worker 540 may identify the container from other containers at the picking station, and may identify a particular storage location for the container in a storage rack at a desired destination.

Controller 110 may include a feedback loop to track the progression through each dependency graph. The feedback loop allows controller 110 to receive input from any actor that is assigned to perform state transformations or subtasks from a dependency graph node. The input may be provided by a wireless device carried or used by a human worker, or by wireless messaging sent from robots or other machines under control of controller 110.

Controller 110 may simultaneously advance through different nodes of different dependency graphs based on the input that is received from the feedback loop. In some embodiments, the input may include a first identifier identifying the actor sending the input, and a second identifier identifying the one or more state transformations that were performed by the actor identified with the first identifier.

Controller 110 may correlate the first identifier and/or second identifier to a particular dependency graph node assigned to a particular actor for execution. Controller 110 may use the second identifier to determine if the one or more state transformations or subtasks associated with the particular dependency graph node were successfully completed. For instance, an object retrieval task may involve a particular actor moving a container from a first location to a second location. Controller 110 may verify successful completion of the object retrieval task in response to receiving the first identifier of the particular actor, and one or more second identifiers that identify the container and the second location.

In response to verifying completion of the state transformations associated with a first node in a dependency graph, controller 110 may remove the first node from the dependency graph, and/or may advance to a second node of the dependency graph that is directly linked to and dependent off the first node. Advancing to the second node may include allocating an actor to perform the operations or subtask of the second node, providing messaging to control the allocated actor in performing the operations or subtask, and/or tracking completion of the operations or subtask by the allocated actor.

Figure 6:
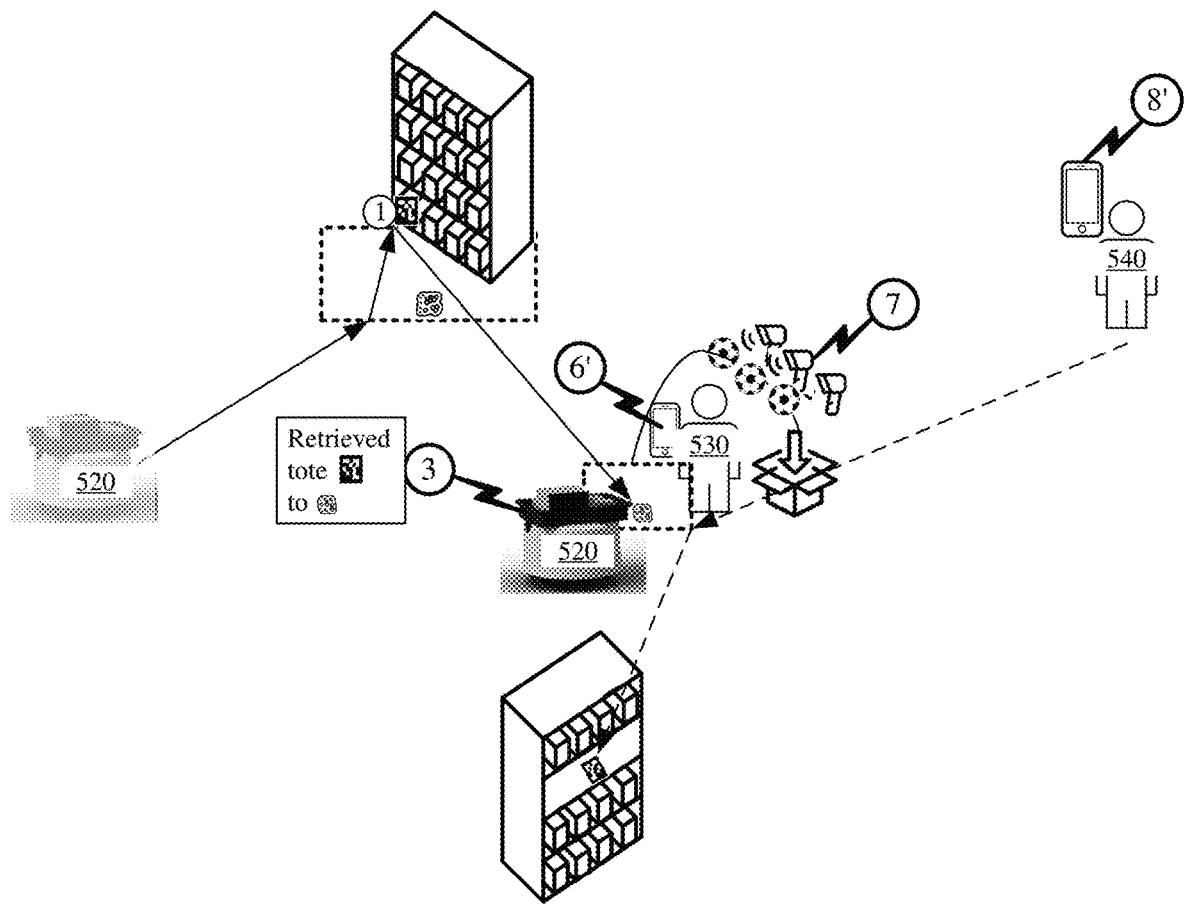
FIG. 6 illustrates the controller orchestrating operations of different actors based on tracked progression through a dependency graph via input that is received from a feedback loop in accordance with some embodiments described herein.
Figure 6:
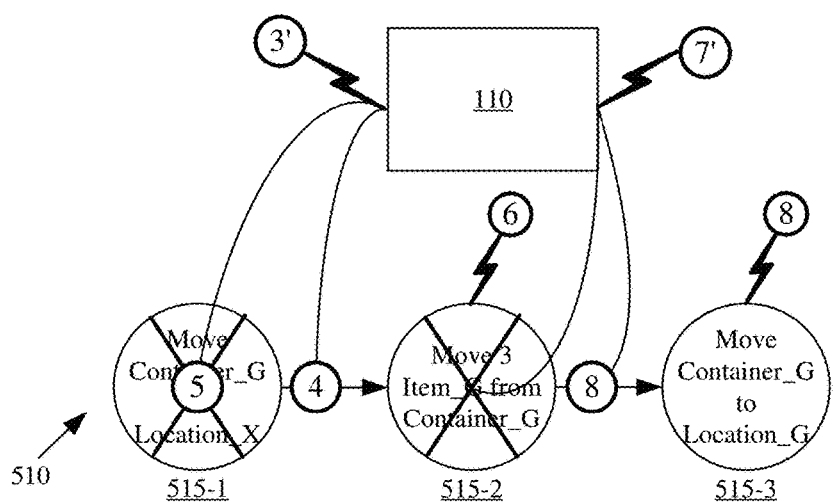

FIG. 6 illustrates controller 110 orchestrating operations of different actors based on tracked progression through dependency graph 510 via input that is received from a feedback loop in accordance with some embodiments described herein. As in FIG. 5, dependency graph 510 includes a linked list of three nodes 515 for ordered execution of three sets of state transformations.

Here again, first node 515-1 is allocated to robot 520 in order to control robot 520 in performing the first set of state transformations associated with first node 515-1. The first set of state transformations includes transferring a particular container from a storage location about a storage rack to a picking station destination.

With regards to the state transformations of first node 515-1, the feedback loop involves robot 520 scanning (at 1) a first identifier of the particular container, scanning (at 2) a second identifier identifying the picking station destination, and wirelessly transmitting (at 3) the first and/or second identifiers to controller 110. Robot 520 may also provide (at 3) a third identifier that uniquely identifies robot 520 to controller 110 in conjunction with the first and/or second identifiers.

Based on the identifiers provided (at 3) by robot 520, controller 110 may determine that robot 520 has successfully completed the first set of state transformations associated with first node 515-1. In particular, controller 110 verifies, based on the received identifiers, that robot 520 has correctly moved the particular container (e.g., the first identifier) to the picking station destination (e.g., the second identifier) in satisfaction of the first set of state transformations. Accordingly, controller 110 may advance (at 4) from first node 515-1 to the next node in dependency graph 510 (e.g., second node 515-2). Controller 110 may also update dependency graph 510 by removing (at 5) first node 515-1 from dependency graph 510, and may further update the current state of robot 520 and resources (e.g., the container, the storage location, the path to the picking station destination, etc.) implicated by first node 515-1.

In advancing (at 4) to second node 515-2, controller 110 may allocate first human worker 530 as an available and capable actor for performing the second set of state transformations of second node 515-2, and/or may direct or control (at 6) first human worker 530 in performing the second set of transformations. In some embodiments, upon robot 520 completing the first set of state transformations, controller 110 may send one or more messages to a device of first human worker 530. The messages may cause the device to present the second set of state transformations to first human worker 530, and may instruct first human worker 530 in performing the second set of state transformations. In some other embodiments, messages encapsulating the second set of state transformations may be sent to first human worker 530 at the time dependency graph 510 is generated and second node 515-2 is allocated to first human worker 530. In some such embodiments, the messages may include a condition that is satisfied upon robot 520 completing the first set of state transformations, and that causes first human worker 530 to begin executing the second set of state transformations. Alternatively, first human worker 530 may independently detect or determine when all dependencies for the second set of state transformations have been met in order to commence execution of the second set of state transformations.

First human worker 530, as well as all other actors orchestrated by controller 110, are part of the feedback loop. In response to receiving (at 6') instructions for performing the second set of state transformations on a device used by first human worker 530, first human worker 530 may use the device to scan each item, or an identifier associated with each item, that is picked from the retrieved container and that is placed into a package at the picking station destination. The scans may be transmitted (at 7) to controller 110 at the same time or as each scan is taken. First human worker 530, via the connected device, may also provide (at 7) a unique identifier, that uniquely identifies first human worker 530 or the worker's device, with the identifiers of the scanned items.

Controller 110 may receive (at 7') the identifiers and/or scans, and may determine that first human worker 530 has moved three units of a particular item from the retrieved container into the package at the picking station destination to successfully complete the second set of state transformations. Accordingly, controller 110 may determine that the operations of second node 515-2 have been completed, and may advance (at 8) to third node 515-3 of dependency graph 510.

In advancing (at 8) to third node 515-3, controller 110 may update the current state of first human worker 530 and resources that were implicated and/or used to complete second node 515-2. Controller 110 may then direct or control operation of second human worker 540 in completing the third set of state transformations that are needed to fully complete the overall task of dependency node 510.

Controller 110 may progress through different dependency graphs at the same time based on inputs provided via the feedback loop by different actors completing operations associated with nodes of different dependency graphs in parallel. As controller 110 progresses through the nodes of different dependency graphs, controller 110 may reallocate the actors from those nodes to pending nodes of the same or different dependency graphs with operations that need to be completed based on the updated current state (e.g., availability, location, and capability) of the actors and also the updated current state of the resources used in the completed nodes.

In some embodiments, controller 110 may use the input from the feedback loop to update the current state of the resources and actors, and may optimize the future allocation of actors based on the updated current state. For instance, if an actor completes a first set of state transformations for a node of a first dependency graph at a first location, controller 110 may allocate that same actor to perform a different second set of transformations for a node of a second dependency graph when the second set of transformations are to occur at the first location where the actor is already positioned. In this manner, controller 110 shifts actors between different pending nodes of different dependency graphs such that one actor is not tied to the nodes of any single dependency graph while that dependency graph is active. Instead, controller 110 orchestrates, uses, and/or controls the actors in a manner that is most efficient in terms of completing the most tasks in the least amount of time.

Controller 110 may also use the feedback loop to dynamically adjust a dependency graph when a failure or issue is detected that prevents successfully completion of state transformations associated with one or more of the dependency graph nodes. Controller 110 may dynamically adjust the dependency graph to correct the failure or issue, or to work around the failure or issue if possible. In some embodiments, controller 110 may provide an alert to one or more systems and/or actors in response to a detected failure or issue.

Figure 7:
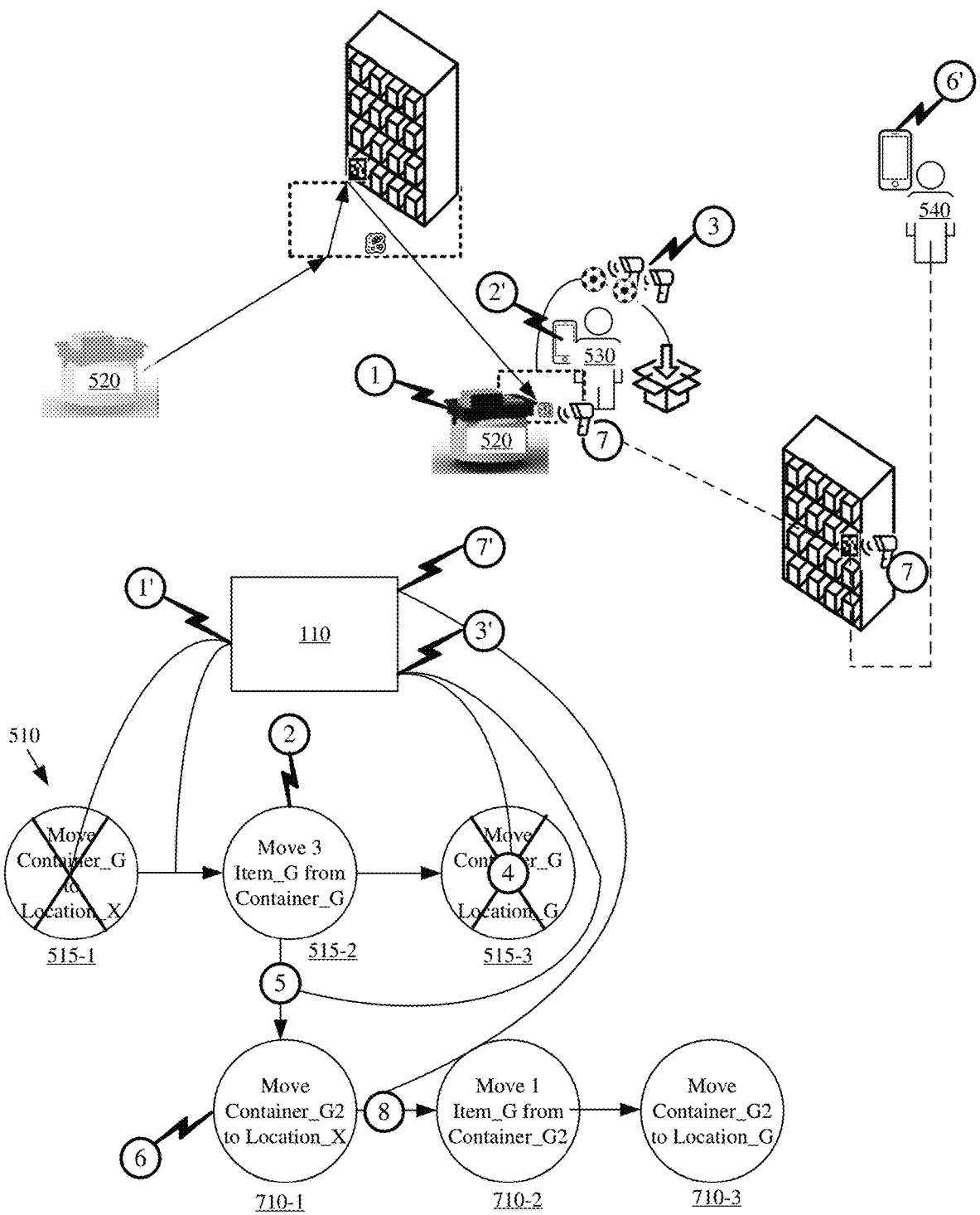
FIG. 7 illustrates the controller dynamically modifying a dependency graph to workaround a detected failure or issue in accordance with some embodiments presented herein.

FIG. 7 illustrates controller 110 dynamically modifying a dependency graph to orchestrate operations of different human workers and autonomous robots that work around a detected failure or issue in accordance with some embodiments presented herein. In FIG. 7, controller 110 progresses from first node 515-1 to second node 515-2 of dependency graph 510 in response to receiving input (at 1') from robot 520 (e.g., scanned identifiers) indicating the transfer of a first container from a storage location to a picking station destination. Accordingly, controller 110 instructs (at 2) first human worker 530 to perform the second set of state transformations associated with second node 515-2.

As before, second node 515-2 includes state transformations for picking three units of an item from the first container, but input provided (at 3) by first human worker 530, via a connected device used by worker 530, indicates that the first container stores only two units of the item. Accordingly, the quantity of items in the first container is insufficient to complete the task represented by dependency graph 510.

To correct for the shortfall, controller 110 may search the current state of resources in the site to determine that additional units of the item are stored in a second container at a second storage location. Controller 110 may then dynamically adjust dependency graph 510 to use the second container as a workaround for correcting the deficiency created by the first container.

In this figure, controller 110 dynamically adjusts dependency graph 510 by removing (at 4) third node 515-3 that was previously dependent on second node, and by appending (at 5) a new second set of nodes 710-1, 710-2, and 710-3 off second node 515-2. Node 710-1 of second set of nodes 710 may include a new set of state transformations for transferring the second container with additional units of the desired item from the second storage location to the picking station destination. Node 710-2 may include state transformations for picking one unit of the item from the second container to correct for the shortfall. Node 710-3 may include state transformations for returning the second container to the storage location of the first container.

Controller 110 may also determine the current state of actors in the site to determine which actors can be allocated to perform the state transformations associated with second set of nodes 710. Controller 110 may select node 710-1 as a next node in the dependency chain needed to complete the task represented by updated dependency graph 510, may allocate (at 6) second human worker 540, that was previously assigned to removed third node 515-3, and may monitor second human worker 540 in completing the state transformations associated with node 710-1. For instance, controller 110 may detect completion of the state transformations associated with node 710-1 in response to receiving (at 7') a first identifier, that identifies the second container, and a second identifier, that identifies the picking station destination, from a device of second human worker 540. Controller 110 may then advance (at 8) from node 710-1 to node 710-2 of modified dependency graph 510, and may continue progressing through second set of nodes 710 of modified dependency graph 510 until the dynamic workaround for completing the overall task is complete.

In some embodiments, controller 110 may dynamically adjust the dependency graphs as actors or resources are added or removed from the system. For instance, a new robotic forklift may be added as an available actor that may be used by controller 110. Controller 110 may determine that the robotic forklift is capable of lifting heavy and large objects, and may change the resource allocation for one or more nodes of dependency graphs that involve transferring heavy or large objects to use the robotic forklift. Similarly, a first actor may go on break, may need recharging, or may experience a failure or damage. In this case, controller 110 may identify the nodes that were previously allocated to the first actor, and may allocate one or more other actors to perform the state transformations associated with those nodes instead of the first actor.

Figure 8:
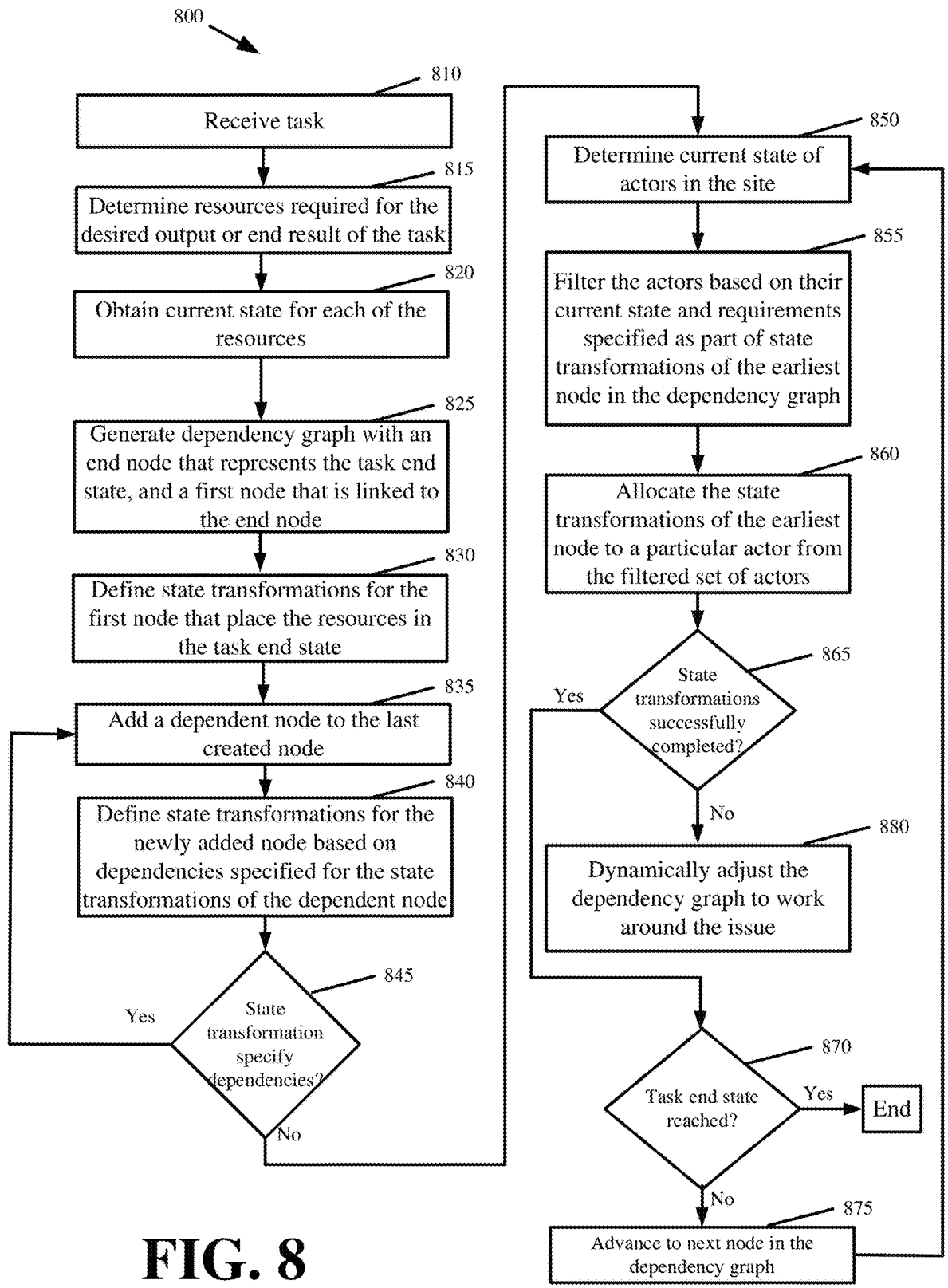
FIG. 8 presents a process for orchestrating task execution by different actors via dependency graphs in accordance with some embodiments described herein.

FIG. 8 presents a process 800 for orchestrating task execution by different actors via dependency graphs in accordance with some embodiments described herein. Process 800 may be implemented by controller 110.

Process 800 may include receiving (at 810) a task. Controller 110 may receive (at 810) the task from an ordering system, from another system that is connected to or may be accessed by controller 110, or from user input. The task may specify a desired output or end result, but may omit the operations that lead to the desired output or end result. For instance, the task may be a customer order for various goods, and the task may omit the operations for locating the goods in a site, aggregating the goods at a particular location, and packaging the goods in a container to ship to the customer. Generally, the task can be any end result that is produced in a site by one or more state transformations that are performed by actors in the site, and that may involve one or more resources in the site.

Process 800 may include determining (at 815) one or more resources required for the desired output or end result of the task. For instance, if the task is for a customer order of different items, controller 800 may identify the different items included in the customer order.

Process 800 may include obtaining (at 820) the current state for each of the one or more resources. In some embodiments, controller 110 may query one or more databases or systems to obtain the current state for each resource. For instance, controller 110 may query an inventory database to determine the location of the resources in the site, the current inventory count, other resources associated with the resources for the end state of the task (e.g., containers that store ordered items, and racks that store the containers, etc.), and/or other characteristics of the resources that may be used for state transformations.

Process 800 may include generating (at 825) a dependency graph with an end node that represents the task end state, and a first node that is linked to the end node of the dependency graph. Process 800 may include defining (at 830) one or more state transformations for the first node that place the resources in the task end state.

Process 800 may include recursively adding (at 835) a dependent node to the last created node (e.g., the first node), and defining (at 840) additional state transformations for the newly added node based on dependencies that are specified for the state transformations of the dependent node and/or dependencies for changing the state of other resources so that the state transformations of the current node can be completed. In some embodiments, each particular state transformation may be specified with a rule that sets forth zero or more dependencies for other state transformations that must occur prior to the particular state transformation taking place, and/or zero or more dependencies for changing the state of other resources prior to the particular state transformation taking place. In the examples provided above, a state transformation to reach an end state for a customer order may include transferring a specified quantity of items into a customer order package. However, the state transformations for transferring the specified quantity of items may include a rule with a dependency for bringing a container with the items from a storage location to a destination.

Process 800 may include determining (at 845) if the state transformations for a newly added node in the dependency graph specify any additional dependencies. In response to determining (at 845—Yes) that one or more dependencies are specified, process 800 may revert to 835 in order to continue adding nodes to the dependency graph to work backwards from the end state towards the current state of the resources needed for the task end state. In response to determining (at 845—No) that no additional dependencies remain, process 800 may include determining (at 850) the current state of actors in the site.

In particular, controller 110 may determine (at 850) the current location, availability, and capability of the actors in the site. As noted above, the actors may include human workers that may operate at different locations in a site, and that may have different skill sets or training for different operations. The actors may also include transitory or stationary robots and/or other machinery.

Controller 110 may determine (at 850) the location, availability, and capability of actors based on the messaging provided by the actors via the feedback loop. Specifically, controller 110 may determine a last location of an actor based on a last message provided by the actor, and may determine availability based on prior allocations of the actors to nodes of different dependency graphs, and whether those nodes are incomplete.

Controller 110 may be programmed with or may reference a database to determine the capabilities of different actors. Some actors may be special purpose actors that excel at or can only complete certain operations or state transformations. Other actors may be general purpose actors that can be used to perform a variety of operations albeit with different performance characteristics.

Controller 110 may account for the performance characteristics of an actor with respect to different operations by monitoring past performance of that actor in completing the operations or by identifying the type, experience level, and/or other information of the actor. In some embodiments, actors may be associated with restrictions that prevent the actors from moving into certain areas in the site, performing certain operations, or performing other state transformations.

Process 800 may include filtering (at 855) the actors based on their current state and based on the requirements specified as part of state transformations of the earliest node in the dependency graph. For instance, the state transformations may specify a requirement for moving a large object, and certain actors may be disqualified because they are incapable of moving large objects even though the actors are not allocated to other nodes.

Process 800 may include allocating (at 860) the state transformations of the earliest node to a particular actor from the filtered set of actors that can most efficiently perform the state transformations of the earliest node using any one or more resources associated with those state transformations. For instance, controller 110 may determine that two different actors are available and capable of performing the state transformations for the earliest node. In some embodiments, controller 110 may select the actor that is closest to the resources implicated by the state transformations, or may select the actor that can perform the state transformations fastest, and may allocate (at 860) the state transformations to the selected actor for execution. Allocating the state transformations may include controlling the selected actor in performing the state transformations.

Process 800 may include detecting (at 865) completion of the state transformations associated with the earliest node by the allocated actor based on input provided by the allocated actor via the feedback loop. In response to detecting (at 865—Yes) that the state transformations have been successfully completed, process 800 may determine (at 870) if the task end state has been reached. In response to determining (at 870—No) that the task end state has not been reached, process 800 may advance (at 875) to the next node in the dependency graph, and may control an actor in performing the state transformations of the next node. In particular, controller 110 may repeat 850, 855, 860, and 865. In response to determining (at 870—Yes) that the task end state has been reached, controller 110 will have successfully orchestrated operations of one or more actors in performing the state transformations of each node in the dependency graph representing the task. In other words, the task is complete. In response to detecting (at 865—No) that the state transformations of the current node have not been successfully completed, process 800 may dynamically adjust (at 880) the dependency graph to work around the issue, or may provide alerts to different actors or systems in the site. Dynamically adjusting (at 880) the dependency graph may include changing the remaining nodes of the dependency graph to specify state transformations that work around the detected issue based on the current state of resources and actors in the site.

Figure 9:
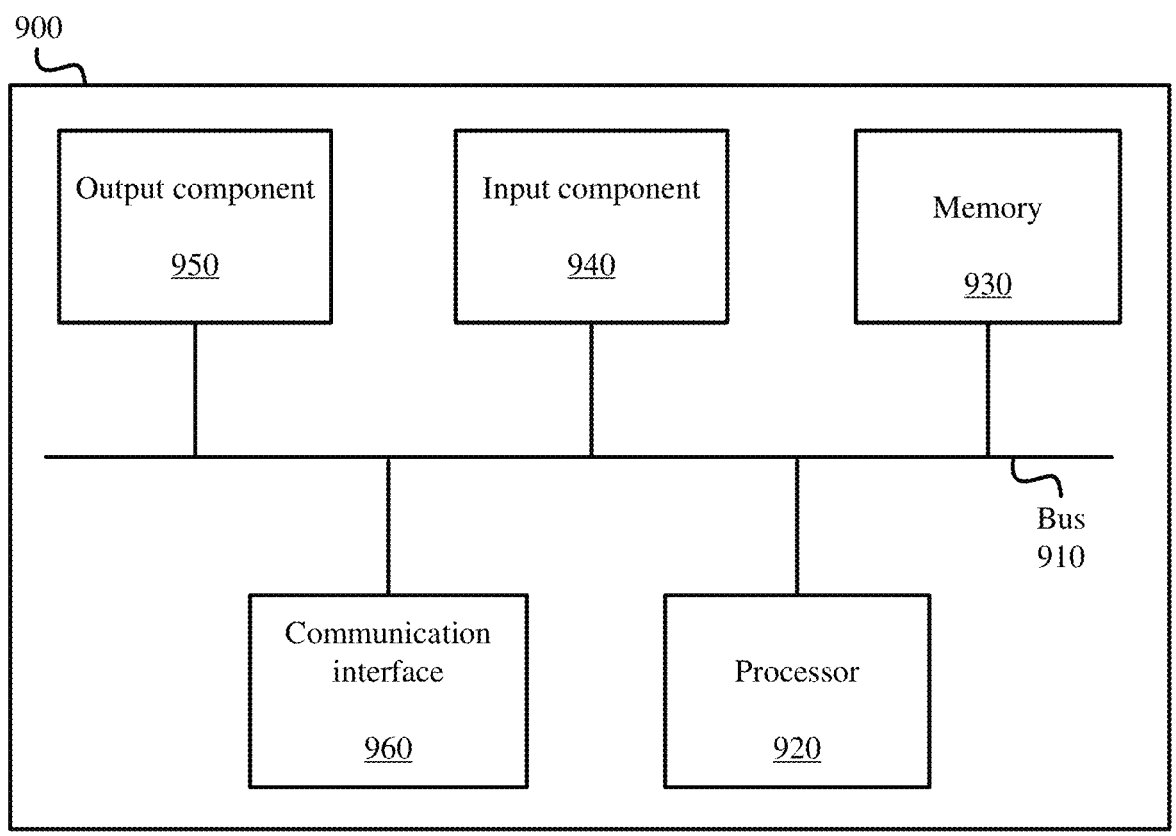
FIG. 9 illustrates example components of one or more devices, according to one or more embodiments described herein.

FIG. 9 is a diagram of example components of device 900. Device 900 may be used to implement one or more of the devices or systems described above (e.g., controller 110). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. A method comprising:
    receiving a task;
    determining, in response to receiving the task, a last set of state transformations that produce an end state of the task before determining a first set of state transformations that produce a start state of the task, wherein the end state is associated with completion of a last set of dependencies required for successful execution of the task;

generating a first node of a dependency graph that comprises the last set of state transformations, the last set of state transformations comprising one or more state transformations that modify the last set of dependencies by changing a first earlier state of a first resource in a site to match the end state of the task;

adding to the dependency graph based on a backward traversal from the end state to the start state of the task, wherein the start state produces an initial set of dependencies required for a next state of the task, and wherein adding to the dependency graph comprises:
  determining that the last set of state transformations depend on successful completion of a next-to-last set of state transformations based on a first backward traversal from the end state of the task, the next-to-last set of transformations producing the last set of dependencies required by the last set of state transformations by changing a second earlier state of the first resource to the first earlier state; and
  inserting a second node of the dependency graph before the first node, wherein the second node comprises the next-to-last set of state transformations;

allocating different actors to different nodes of the dependency graph via a forward traversal that is opposite to the backward traversal with which the different nodes are added to the dependency graph, wherein allocating the different actors comprises allocating a first actor to perform the next-to-last set of state transformations defined for the second node of the dependency graph before allocating a second actor to perform the last set of state transformations defined for the first node of the dependency graph; and controlling execution of the task based on the forward traversal of the nodes of the dependency graph, wherein said controlling comprises:
  controlling a first robot, that is allocated as the first actor, in performing the next-to-last set of state transformations; and
  controlling the second actor in performing the last set of state transformations after detecting successful completion of the next-to-last set of state transformations.

2. The method of claim 1 further comprising:
selecting the first resource from a plurality of resources in the site based on one or more resources needed to reach the end state of the task; and
determining a current state of the first resource in the site, wherein the next-to-last set of transformations and the last set of transformations change the first resource from the current state to an end state required for the end state of the task.

3. The method of claim 1, further comprising:
determining that the last set of state transformation are further dependent on changing a state of a different second resource from a first state to a second state;
allocating the second resource to the second node of the dependency graph; and
defining the next-to-last set of state transformations with one or more state transformations that change the first state of the second resource to the second state.

4. The method of claim 3,
wherein the second resource contains multiple units of the first resource;
wherein the next-to-last set of state transformations comprises moving the second resource from a first location to a second location; and wherein the last set of state transformations comprises removing one or more units of the first resource from the second resource at the second location.

5. The method of claim 1, wherein controlling execution of the task further comprises:
receiving input from the first actor;
verifying completion of the next-to-last set of state transformations based on the input; and
providing the last set of state transformations to the second actor in response to said verifying.

6. The method of claim 5, wherein the input comprises:
a first identifier identifying the first resource; and
a second identifier identifying the first earlier state for the first resource.

7. The method of claim 1, wherein controlling the second actor comprises:
directing a human, that is allocated as the second actor, in performing the last set of state transformations.

8. The method of claim 1, wherein controlling the second actor comprises:
controlling a second robot, that is allocated as the second actor, in performing the last set of state transformations.

9. The method of claim 1, wherein controlling execution of the task further comprises:
completing the next-to-last set of state transformations with the first actor at a particular location;
transferring a result of the next-to-last set of state transformations from the first actor to the second actor at the particular location; and
initiating execution of the last set of state transformations with the second actor from the particular location using said result.

10. The method of claim 1 further comprising:
determining a first set of requirements associated with performing the last set of state transformations, and a different second set of requirements associated with performing the next-to-last set of state transformations;
wherein allocating the different actors comprises:
  allocating the first actor from a plurality of actors to the second node based on capabilities of the first actor matching the second set of requirements, where allocating the first actor to the second node comprises assigning the first actor to perform the next-to-last set of state transformations; and
  allocating the second actor from the plurality of actors to the first node based on capabilities of the second actor matching the first set of requirements.

11. The method of claim 1 further comprising:
determining a current state of a plurality of actors operating in the site at a first time prior to said controlling the first robot, wherein the current state of the plurality of actors comprises availability, location, and capability of each actor of the plurality of actors at the first time;
selecting the first actor for the next-to-last set of state transformations based on the availability, location, and capability of the first actor leading to fastest execution of the next-to-last set of state transformations at the first time;
determining the current state of the plurality of actors operating in the site at a different second time prior to said controlling the second actor; and
selecting the second actor for the last set of state transformations based on the availability, location, and capability of the second actor leading to fastest execution of the last set of state transformations at the second time.

12. The method of claim 1, wherein the task is a first task, the method further comprising:
receiving a second task that is different than the first task while the first task remains outstanding;
generating a second dependency graph with a first node comprising a first set of state transformations that change a first earlier state of a different second resource in the site to an end state required for an end state of the second task;
generating the second dependency graph with a second node before the first node of the second dependency graph, the second node comprising a second set of state transformations that change a second earlier state of the second resource to the first earlier state of the second resource.

13. The method of claim 1 further comprising:
detecting unsuccessful completion of the next-to-last set of state transformations;
adjusting the dependency graph in response to said detecting, wherein said adjusting comprises:
replacing the first node of the dependency graph with a third node, and with a fourth node that is dependent off the third node and that is linked to the second node;
defining a set of state transformations for the fourth node that workaround an issue in the next-to-last set of state transformations, and that change the second earlier state of the first resource to a new state that is different than the first earlier state; and
defining a different set of state transformations for the third node that change the new state of the first resource to the end state required for the end state of the task.

14. The method of claim 1, wherein the first earlier state and the second earlier state of the first resource comprise different locations between which the first resource is moved.

15. The method of claim 1, wherein the first earlier state and the second earlier state of the first resource comprise a change in state resulting from adding to or removing from the first resource.

16. The method of claim 1, wherein the first earlier state is a result of physical manipulations made to the second earlier state of the first resource as a result of the next-to-last set of state transformations.

17. The method of claim 1,
wherein said controlling the first robot comprises providing a first set of wireless messages to a wireless radio of the first robot, wherein the first set of wireless messages control operation of the first robot in performing the next-to-last set of transformations;
the method further comprising detecting successful execution of the next-to-last set of state transformations in response to receiving one or more identifiers from the wireless radio of the first robot.

18. The method of claim 17,
wherein said controlling the second actor comprises providing a second set of wireless messages to the second actor, wherein the second set of wireless present instructions on a wireless device with which the second actor is to perform the last set of state transformations.

19. A device comprising:
one or more processors configured to:
receive a task;
determine, in response to receiving the task, a last set of state transformations that produce an end state of the task before determining a first set of state transformations that produce a start state of the task, wherein the end state is associated with completion of a last set of dependencies required for successful execution of the task;
generate a first node of a dependency graph that comprises the last set of state transformations, the last set of state transformations comprising one or more state transformations that modify the last set of dependencies by changing a first earlier state of a first resource in a site to match the end state of the task;
add to the dependency graph based on a backward traversal from the end state to the start state of the task, wherein the start state produces an initial set of dependencies required for a next state of the task, and wherein adding to the dependency graph comprises:
determining that the last set of state transformations depend on successful completion of a next-to-last set of state transformations based on a first backward traversal from the end state of the task, the next-to-last set of transformations producing the last set of dependencies required by the last set of state transformations by changing a second earlier state of the first resource to the first earlier state; and
inserting a second node of the dependency graph before the first node, wherein the second node comprises the next-to-last set of state transformations;
allocate different actors to different nodes of the dependency graph via a forward traversal that is opposite to the backward traversal with which the different nodes are added to the dependency graph, wherein allocating the different actors comprises allocating a first actor to perform the next-to-last set of state transformations defined for the second node of the dependency graph before allocating a second actor to perform the last set of state transformations defined for the first node of the dependency graph; and
control execution of the task based on the forward traversal of the nodes of the dependency graph, wherein controlling execution comprises:
controlling a first robot, that is allocated as the first actor, in performing-the next-to-last set of state transformations; and
controlling the second actor in performing the last set of state transformations after detecting successful completion of the next-to-last set of state transformations.

* * * * *